(12) United States Patent
Bomer et al.

(10) Patent No.: US 11,783,241 B2
(45) Date of Patent: *Oct. 10, 2023

(54) SYSTEM AND METHOD FOR TRACKING ACTIVITY OF A PLURALITY OF MACHINES

(71) Applicant: Caterpillar Inc., Peoria, IL (US)

(72) Inventors: Bradley K. Bomer, Pekin, IL (US); Chad T. Brickner, Dunlap, IL (US); Shane C. McBride, Denver, CO (US); Vishnu G. Selvaraj, Trichy (IN)

(73) Assignee: Caterpillar Inc., Peoria, IL (US)

( * ) Notice: Subject to any disclaimer, the term of this patent is extended or adjusted under 35 U.S.C. 154(b) by 323 days.

This patent is subject to a terminal disclaimer.

(21) Appl. No.: 16/941,218

(22) Filed: Jul. 28, 2020

(65) Prior Publication Data
US 2022/0036266 A1 Feb. 3, 2022

(51) Int. Cl.
*G06Q 10/0631* (2023.01)
*H04Q 9/00* (2006.01)

(52) U.S. Cl.
CPC ......... *G06Q 10/06311* (2013.01); *H04Q 9/00* (2013.01); *H04Q 2209/40* (2013.01)

(58) Field of Classification Search
CPC .. H04Q 9/00; H04Q 2209/00; H04Q 2209/10; H04Q 2209/40; H04Q 2209/70; H04Q 2209/75; H04Q 2209/80; H04Q 2209/82; H04Q 2209/826; H04Q 2209/84; G06Q 10/06311; E02F 9/261; E02F 9/205; E02F 9/2054; E02F 9/264; G07C 5/00; G07C 5/008; G07C 5/02; G07C 5/08
See application file for complete search history.

(56) References Cited

U.S. PATENT DOCUMENTS

| | | | |
|---|---|---|---|
| 5,546,093 A | 8/1996 | Gudat et al. | |
| 6,665,613 B2 | 12/2003 | Duvall | |
| 7,835,351 B2 | 11/2010 | Mosko et al. | |
| 8,386,134 B2 | 2/2013 | Morey et al. | |
| 9,663,033 B2 | 5/2017 | Bharwani | |
| 10,068,477 B2 | 9/2018 | Miller et al. | |
| 10,482,402 B2 | 11/2019 | Williams | |
| 10,872,302 B2 * | 12/2020 | Selvaraj | E02F 9/2054 |
| 2012/0253709 A1 * | 10/2012 | Schmidt | G07C 5/085 |
| | | | 702/188 |

(Continued)

FOREIGN PATENT DOCUMENTS

| | | | | |
|---|---|---|---|---|
| WO | 2020087171 A1 | 5/2020 | | |
| WO | WO-2020087171 A1 * | 5/2020 | | E02F 9/205 |

*Primary Examiner* — Franklin D Balseca (57) ABSTRACT

A system and method for tracking activity of a plurality of machines can comprise identifying at least one work segment of a smart machine based on sensor data from one or more sensors of the smart machine; and identifying at least one work segment of each of a plurality of non-smart machines based on the identified at least one work segment of the smart machine and location data transmitted from the non-smart machine. The identified at least one work segment of the smart machine can be identified in association a first location at a worksite. The at least one work segment of each of the non-smart machines can be identified when the non-smart machine is within a predetermined distance of the first location associated with the identified at least one work segment of the smart machine.

9 Claims, 4 Drawing Sheets

(56) References Cited

U.S. PATENT DOCUMENTS

2014/0214264 A1    7/2014  Campagna et al.
2018/0174377 A1*  6/2018  Collins .................. E02F 9/261
2018/0176750 A1    6/2018  Xu et al.
2018/0313061 A1*  11/2018  Cai ......................... G07C 3/08
2020/0193342 A1    6/2020  Selvaraj
2021/0216889 A1*  7/2021  Spurgeon ............... E02F 9/261

* cited by examiner

SYSTEM AND METHOD FOR TRACKING ACTIVITY OF A PLURALITY OF MACHINES

TECHNICAL FIELD

The present disclosure relates to tracking activity of a plurality of machines, and more particularly to systems and methods for tracking activity of at least one smart machine and/or at least one non-smart or so-called dumb machine.

BACKGROUND

Conventional methods of machine control may identify segments of a work cycle (e.g., dig/haul/dump) of work machines, such as haul trucks, based on data from sensors located on each work machine in a fleet. However, sensors on multiple work machines (e.g., all of the work machines) can be expensive, difficult to coordinate or calibrate, and more prone to failure, at least in part, in terms of the entire fleet.

U.S. Pat. No. 5,546,093 ("the '093 patent") describes a system and method for providing navigation signals between first and second earthmoving or construction machines. The system can determine the positions of the first and second machines, and determine a desired location of the second machine relative to the first machine based on an optimum path. According to the '093 patent, the desired location can be transmitted from the first machine to the second machine.

SUMMARY OF THE DISCLOSURE

In one aspect, the present disclosure implements a method of tracking activity of a plurality of machines at a worksite comprising: providing, in real time, a geofence defining an area around a location associated with an identified work segment of a work cycle of a smart machine of the plurality of machines; and identifying, in real time, at least one work segment of a work cycle of each of a plurality of dumb machines of the plurality of machines when the dumb machine is determined to enter the area defined by the geofence based on only location information transmitted from the dumb machine, the location information including a location and a corresponding time at the location for the dumb machine.

In another aspect, the present disclosure implements or provides a non-transitory computer-readable storage medium storing computer-readable instructions that, when executed by one or more computers, cause the one or more computers to perform a method comprising: identifying at least one work segment of a smart machine based on sensor information from one or more sensors of the smart machine; and identifying at least one work segment of each of a plurality of dumb machines based on the identified at least one work segment of the smart machine and data transmitted from the dumb machine, the data including only location information of the dumb machine. The identified at least one work segment of the smart machine can be identified in association a first location at a worksite. The at least one work segment of each of the dumb machines can be identified when the dumb machine is within a predetermined distance of the first location associated with the identified at least one work segment of the smart machine.

In yet another aspect a system for managing data from a worksite can be provided or implemented. The system can comprise a back office telematics system, including processing circuitry, to automatically characterize work segments of work cycles at the worksite; a smart haul truck at the worksite to gather first operating data from a plurality of sensors of the smart haul truck and send, via first communication circuitry of the smart haul truck, the gathered first operating data to the back office telematics system via a wireless communication network; and a plurality of non-smart haul trucks at the worksite to send second operating data back to the back office telematics system. The first operating data of the smart haul truck can represent a work segment of a work cycle of the smart haul truck within the worksite. The second operating data from the non-smart haul trucks can include only location information associated with the non-smart haul trucks within the worksite. The back office telematics system can automatically characterize work segments of each of the non-smart haul trucks by characterizing, using the first operating data, the work segment of the smart haul truck based on the first operating data, and associating the characterized work segment of the smart haul truck to a work segment of the non-smart haul truck based on the second operating data from the non-smart haul truck that includes only the location information associated with the non-smart haul truck.

Other features and aspects of this disclosure will be apparent from the following description and the accompanying drawings.

DETAILED DESCRIPTION

The present disclosure relates to managing activity-related data regarding a plurality of machines, and more particularly to systems and methods for tracking activity of at least one so-called smart machine and/or at least one so-called non-smart or dumb machine. Such activity tracking, according to embodiments of the disclosed subject matter, can be in real time. In general, embodiments of the disclosed subject matter can collect sensor data from a mobile smart machine at a worksite, determine one or more work segments performed by the smart machine based on the sensor data, and associate the determined work cycle segments with tasks performed by the mobile dumb machines at the worksite using location information (e.g., only location information) associated with the dumb machines.

Figure 1:
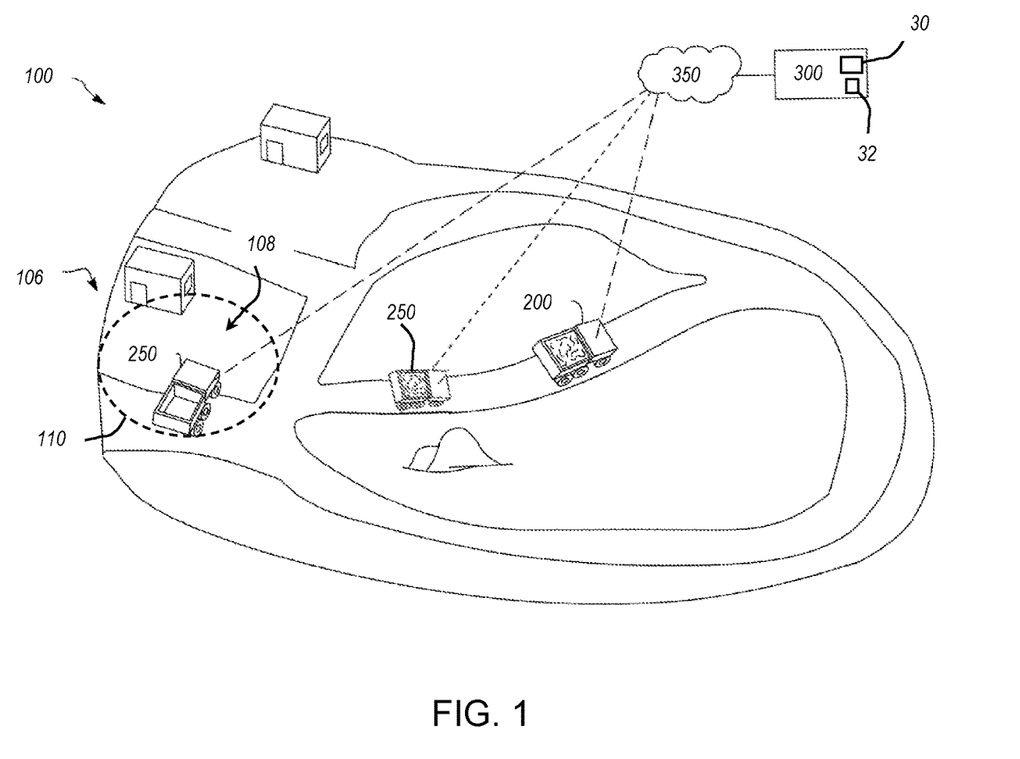
FIG. 1 illustrates a system for managing activity-related data regarding machines at a worksite according to one or more embodiments of the disclosed subject matter.

FIG. 1 illustrates a system 100 for managing data managing activity-related data regarding machines at a worksite 106 according to embodiments of the disclosed subject matter. The worksite 106 can pertain to activities, including mining, construction, transportation, agriculture, manufacturing, etc. Generally, the system 100 can be comprised of a smart machine 200, at least one (e.g., a plurality of) non-smart or dumb machines 250, and a back office system 300.

The ratio of smart machines 200 to dumb machines 250 may be based upon the particular environment of a project, for instance, the size of the worksite 106. Thus, though embodiments of the disclosed subject matter may implement a single smart machine 200 and one or more dumb machines 250, embodiments of the disclosed subject matter are not so limited. Hence, multiple smart machines 200 may be implemented, for instance, in a case where the work environment (e.g., worksite 106) is relatively large or covers a relatively long distance. Moreover, the dumb machines 250, as a group or fleet at the worksite 106, may be homogeneous or heterogeneous in nature, meaning that the dumb machines 250 can be all of a same type of machine (e.g., a haul truck) or different types of machines (e.g., a haul truck and a wheel loader).

The back office system 300 may be in communication with the smart machine 200 and the dumb machines 250 via one or more communication networks 350. The one or more communication networks 350 may be wireless communication networks (that implement corresponding communication protocols), such as a cellular network, a satellite-based network, the Internet, a local area network (LAN), etc. Thus, the communication network(s) 350 can embody any network that provides communication between and/or among one or more facilities, computer systems, and/or servers, such as between the back office system 300 and the smart machine 200 and/or between the back office system 300 and the dumb machines 250.

Generally, a smart machine 200, according to embodiments of the disclosed subject matter, can be a mobile work machine that can output more, i.e., different types, of machine activity-related data to the back office system 300 than can or do the dumb machines 250. For instance, dumb machines 250 may be configured to output primarily location information or primarily location and time information to the back office system 300, whereas the smart machine 200 can capture machine activity-related data from sensors onboard the smart machine 200 and output the data to the back office system 300. Put another way, the smart machine 200 can report its activity to the back office system 300 or the like, whereas each dumb machine 250 can report primarily its location (or location and time at the location). Optionally, each dumb machine 250 may report to the back office system 300 only location information or only information regarding location and time at the location. Such machine activity-related data sent from the smart machine 200 may be referred to herein as first operating data, and such data sent from the dumb machines 250 may be referred to herein as second operating data. Hence, the sensors onboard the smart machine 200 can sense machine activity-related data pertaining to actions or activity of the smart machine 200, particularly as the actions relate to one or more work segments, for instance, of a work cycle, of the smart machine 200.

Machines, as used herein to refer to smart machines (e.g., smart machine 200) and dumb machines (e.g., dumb machines 250) according to embodiments of the disclosed subject matter, may be mobile machines configured to perform one or more operations or tasks associated with an environment of the project, which may be or include the worksite 106. Thus, machine, as the term is used herein, can refer to a mobile machine that performs some type of operation associated with a particular industry, such as mining, construction, farming, etc., and operates between or within project environments (e.g., construction site, mine site, power plants, etc.). Non-limiting examples of mobile machines include construction machines, such as trucks, cranes, earth moving vehicles, mining vehicles, backhoes, material handling equipment, farming equipment, or any type of movable machine that operates in a work environment. For instance, in FIG. 1 the machines, i.e., smart machine 200 and dumb machines 250, are haul trucks, though embodiments of the disclosed subject matter are not so limited. Machines according to embodiments of the disclosed subject matter may be driven by a combustion engine or an electric motor, as non-limiting examples.

Figure 2:
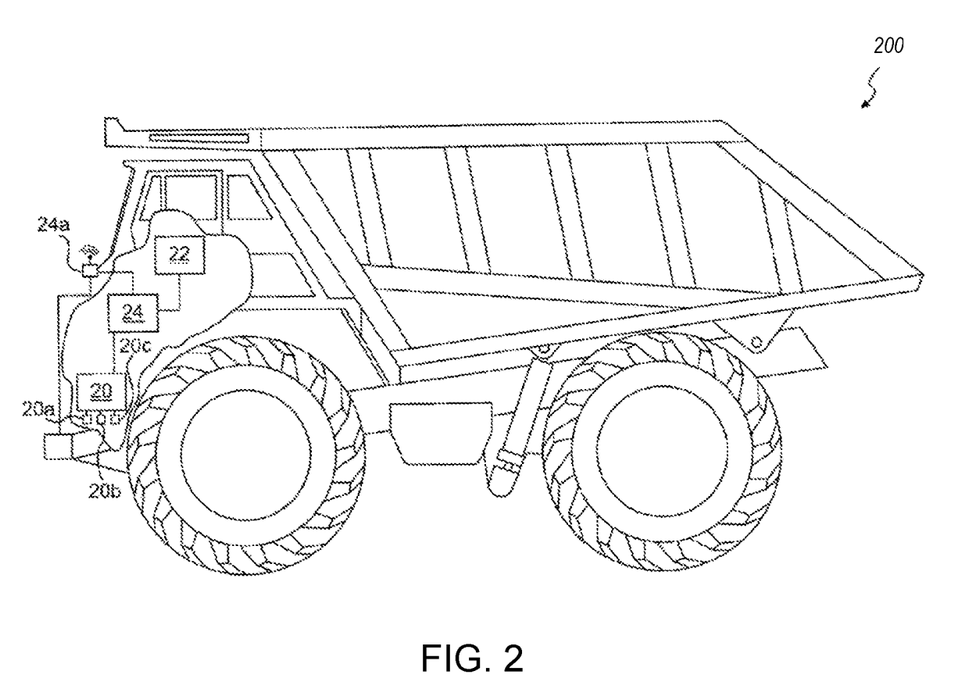
FIG. 2 is a diagram of a smart machine according to embodiments of the disclosed subject matter.

FIG. 2 is a diagram of smart machine 200 in the form of a haul truck according to embodiments of the disclosed subject matter. Generally, the smart machine 200, during operations at the worksite 106, may capture machine activity-related data regarding its operation. The data may include positional data, operator data, machine identification data, performance data, worksite data, diagnostic data, and other data. More specifically, the data can be representative of actions or activity of the smart machine 200, particularly as the actions relate to one or more work segments, for instance, of a work cycle, of the smart machine 200. Such machine activity-related data may be used to identify one or more work segments of the smart machine 200 and/or characterize one or more work segments of the dumb machines 250 based on the identified work segment(s) of the smart machine 200. For instance, with respect to the smart machine 200 as a haul truck, the work segments may be characterized as pertaining to a filling or loading operation, a hauling operation, or a dumping operation.

The machine activity-related data of the smart machine 200 may be transmitted to the back office system 300. To facilitate the collection and transmission of machine activity-related data from the smart machine 200 at the worksite 106 to the back office system 300, the smart machine 200 can have a plurality of sensors 20a, 20b, 20c, etc. an onboard controller 20, and a communication controller 24. The smart machine 200 may also have an operator interface component 22.

Each of the onboard controller 20, the operator interface component 22, and the communication controller 24 may be implemented by or include a processor and/or processing circuitry of the smart machine 200. Though FIG. 2 shows sensors 20a, 20b, 20c. etc. provided at the front of the smart machine 200, the sensors 20a, 20b, 20c, etc. may be distributed throughout the smart machine 200, according to the nature of the machine activity-related data desired to be captured.

As noted above, the sensors 20a, 20b, 20c, etc. onboard the smart machine 200 can sense machine activity-related data pertaining to actions or activity of the smart machine 200, particularly as the actions relate to one or more work segments of the smart machine 200. The type of such sensors can be based on the configuration or type of the smart machine 200. For instance, the smart machine 200 in the form of a haul truck, such as shown in FIG. 1 and FIG. 2, can have sensors including a dump bed switch, an inclinometer, an inertial navigation unit (INU), an inertial measurement unit (IMU), a global positioning system (GPS) unit, a global navigation satellite system (GNSS) unit, and/or other sensors that may be used to identify the one or more work segments (e.g., loading, hauling, or dumping operations).

One or more of the sensors 20a, 20b, 20c, etc. in the form of a positional sensor, such as the global navigation satellite system (GNSS) sensor, may be used to gather data pertaining to positional coordinates of the smart machine 200, its direction of travel, and/or speed. As yet another example, the sensors 20a, 20b, 20c, etc. may further include a speed sensor, such as a wheel speed sensor, to determine the speed at which the smart machine 200 is traveling. Other pieces of information may be generated or maintained by the onboard controller 20 such as time of day or date, for instance, provided in association with the various data from the sensors 20*a*, 20*b*, 20*c*, etc., including location data of the smart machine 200.

The communication controller 24 may communicate over a communication channel as defined herein with a transmitter or a transceiver 24*a*, for instance. Data received by the onboard controller 20 and/or the operator interface component 22 may be sent off board to the back office system 300 by way of the communication controller 24. That is, machine activity-related data from sensors 20*a*, 20*b*, 20*c*, etc. may be output to the back office system 300 by way of the communication controller 24 and the onboard controller 20. The onboard controller 20 may package some or all of the machine activity-related data from the sensors 20*a*, 20*b*, 20*c*, etc. and send the packaged data to the back office system 300. Optionally, machine activity-related data from the sensors 20*a*, 20*b*, 20*c*, etc. that pertains to work segments of the smart machine 200, or that may be used to determine or characterize work segments of the smart machine 200, may be packaged separately, for instance, as a subset of all of the machine activity-related data gathered by the onboard controller 20. The onboard controller 20 may cause the machine activity-related data, whether packaged or not, to be output to the back office system 300 periodically (e.g., every 10 minutes, every hour, every day, etc.).

Optionally, according to one or more embodiments, the onboard controller 20 of the smart machine 200, for instance, a processor or processing circuitry thereof, may identify or characterize a particular work segment of the smart machine 200 based on onboard analysis of the machine activity-related data of one or more of the sensors 20*a*, 20*b*, 20*c*, etc. Generally, identification or characterization of a work segment as it pertains to the smart machine 200 may include identifying a work segment (e.g., a loading operation, a hauling operation, or a dumping operation) of the smart machine 200 based on machine activity-related data from one or more of the sensors 20*a*, 20*b*, 20*c* and associating the identified work segment with a particular location at the worksite 106. Accordingly, the work segment can be characterized in terms of the particular type of work (e.g., a dumping operation) and the location associated with the work segment. Thus, in one or more embodiments, the smart machine 200 may characterize or label one or more work segments thereof based on machine activity-related data from one or more of the sensors 20*a*, 20*b*, 20*c*, etc., and control the communication controller 24 to output information corresponding to the already-characterized work segment to the back office system 300.

As a non-limiting example, actuation of a dump bed switch may be indicative of a dumping operation (i.e., work segment), and hence may be used by the onboard controller 20 of the smart machine 200 to identify occurrence of a dumping operation. The onboard controller 20 can further associate the location of the smart machine 200 to the identified work segment, to thus provide the specific type of work segment and corresponding location at which the smart machine 200 performed this work segment. Other non-limiting examples in the context of the smart machine 200 in the form of a haul truck include weight sensors to determine when the smart machine 200 has been loaded or unloaded, speed and weight sensors to determine whether the smart machine 200 is performing a hauling operation or a traversing operation to return to where the loading operation is performed, etc.

The operator interface component 22 may include or be communicatively connected to one or more operator data input devices such as a press-able button, a movable dial, a keyboard, a touchscreen, a touchpad, a pointing device, or any other means of input. The operator interface component 22 may further include a display, such as a liquid crystal display (LCD) screen, by which an operator of the smart machine 200 may view various parameters and/or settings of the smart machine 200.

Each dumb machine 250 may have a GPS unit or a GNSS unit to identify location of the dumb machine 250. Thus, the dumb machines 250 may be able to output to the back office system 300 location information (or location and time information). In this regard, the dumb machines 250 may not output (including not being capable of capturing or outputting) other machine activity-related data, such as discussed above regarding the smart machine 200. For instance, the dumb machines 250 may not have sensors to capture such other machine activity-related data.

The back office system 300 can include at least one processor 30 and memory 32. The processor 30 may include or otherwise be able to access (read from and/or write to) the memory 32. Optionally, the at least one processor 30 may be representative of a server or group of servers (e.g., via the cloud). Not expressly shown, the back office system 300 can have a remote services component and a telematics component, which may be implemented or controlled using the at least one processor 30. Thus, the back office system 300 may be characterized as a back office telematics system.

The remote services component, which may be operatively coupled to the telematics component, can provide memory, a data aggregator, graphical user interface (GUI) logic, and a digital stewardship platform (DSP). The telematics component can provide capabilities including MQs (i.e., messaging over message server according to MQ Telemetry Transport (MQTT)), an ED, and a common data service (CDS). The telematics component can also provide a gateway (e.g., priority Queue) between the back office system 300 and the smart machine 200 and between the back office system 300 and the dumb machines 250. Generally, the telematics component can integrate telematics data (e.g., work cycle timing, loads handled, operating hours, location, fuel consumed, odometer, etc.) for one or more machines, such as the smart machine 200 and the dumb machines 250. The telematics component can also establish a network interface and communicate with the communication controller 24 of the smart machine 200 via the network interface (and the communication network 350).

The back office system 300 can receive machine activity-related data from the smart machine 200 via the network 350. Some or all of the data may pertain to characterizations of respective one or more work segments of the smart machine 200 either directly (e.g., the smart machine 200 has provided the characterization(s)) or indirectly (e.g., for the back office system 300 to analyze and characterize). As noted earlier, in the context of a haul truck, the work segment characterizations may include a loading operation, a hauling operation, or a dumping operation, for instance.

In a case where the back office system 300 characterizes the one or more work segments of the smart machine 200, the back office system 300 can receive the machine activity-related data from the smart machine 200 and analyze the data to identify or characterize a particular work segment of the smart machine 200. As noted above, identification or characterization of a work segment as it pertains to the smart machine 200 may include identifying a work segment (e.g., a loading operation, a hauling operation, or a dumping operation) of the smart machine 200 based on machine activity-related data from one or more of the sensors 20*a*, 20*b*, 20*c* and associating the identified work segment with a particular location at the worksite 106. Accordingly, the work segment can be characterized in terms of the particular type of work and the location of the smart machine 200 when the smart machine 200 performs the work. Thus, in one or more embodiments, the back office system 300 may characterize or label one or more work segments of the smart machine 200 based on machine activity-related data from one or more of the sensors 20a, 20b, 20c, etc.

Multiple work segments of the smart machine 200 may be characterized. The characterizations of the multiple work segments may be part of a single work cycle of the smart machine 200 (e.g., a load operation, a hauling operation, and a dumping operation). Additional or alternatively, the characterizations of the multiple work segments may be for different work cycles of the smart machine 200 (e.g., a load operation and a subsequent load operation).

Optionally, a virtual boundary (e.g., a geofence) at the worksite 106 may be set, for instance, by the back office system 300, to define one or more of the identified work segment locations. FIG. 1, for instance, shows a virtual boundary 110 set around a location 108 of a loading operation work segment, such virtual boundary 110 having being set by the prior characterization of the work segment for the smart machine 200 at the location 108. In the case of multiple work segments, each characterized work segment of the smart machine 200 may result in the setting of a corresponding virtual boundary 110. Discussed in more detail below, the virtual boundaries, such as virtual boundary 110, may be used to associate work segments of the smart machine 200 to work segments of the dumb machines 250.

In the case of multiple smart machines 200 at the worksite 106, the virtual boundary 110 may be set for each of the smart machines 200 when each of the smart machines 200 performs the same type of work segment. For instance, characterization of a dump operation of a first smart machine 200 may set a first virtual boundary relative to a first location, and characterization of a subsequent dump operation of another smart machine may set a second virtual boundary. The second virtual boundary may replace the first virtual boundary if the dump location associated with the second virtual boundary is close enough to the dump location associated with the first virtual boundary. Alternatively, if the dump location associated with the second virtual boundary is not within a predetermined distance from the dump location of the first virtual boundary, the first virtual boundary and the second virtual boundary may be retained as identifiers of dump locations.

According to one or more embodiments, the virtual boundary 110 for each identified work segment of the smart machine 200 may be relocated when the smart machine 200 again performs a previously characterized work segment. For instance, if the smart machine 200 performs a dump operation close to but offset from a previous dump operation the virtual boundary 110 may be relocated from the location of the previous dump operation to the location of the most recent dump operation for the smart machine 200.

The back office system 300 can also receive machine-related data from the dumb machines 250, including data corresponding to location of the dumb machine 250. Optionally, such location data can be provided in association with a corresponding time at which the dumb machine 250 was at the location.

The back office system 300 can use the location data of the dumb machine 250 to characterize work segments of the dumb machine 250 based on respective previously identified work segments of the smart machine 200. More specifically, the back office system 300 can associate the previously determined work segment of the smart machine 200 with a work segment of the dumb machine 250 based on the location of the dumb machine 250, as determined according to the location information received from the dumb machine 250. Such association of the work segment of the dumb machine 250 can be when or responsive to the dumb machine 250 being determined to be, based on its position information, within a predetermined distance from the location associated with the previously identified work segment of the smart machine 200. Moreover, the predetermined distance may be defined according to a virtual boundary (e.g., a geofence), such as the virtual boundary 110 shown in FIG. 1. That is, when the location information from a dumb machine 250 to the back office system 300 indicates that the dumb machine 250 has reached a virtual boundary at the worksite 106, such as virtual boundary 110, the back office system 300 can characterize the operation of the dumb machine 250 at this location as corresponding to the work segment of the smart machine 200 associated with the virtual boundary.

Multiple work segments of each of the dumb machines 250 may be characterized. The characterizations of the multiple work segments for each dumb machine 250 may be part of a single work cycle of the dumb machine 250 (e.g., a loading operation, a hauling operation, and a dumping operation). Additional or alternatively, the characterizations of the multiple work segments for each dumb machine 250 may be for different work cycles of the dumb machine 250 (e.g., a loading operation and a subsequent loading operation).

As the foregoing relates to the example in FIG. 1, the smart machine 200 can perform a loading operation at location 108. Based on machine activity-related data from the smart machine 200, the smart machine 200 can be determined to have performed the loading operation, the location 108 can be characterized or identified as corresponding to a work segment of the smart machine 200 in the form of the loading operation, and the virtual boundary 110 can be set relative to the location 108. The smart machine 200, once loaded, can move from the location 108 to perform a hauling operation, as shown in FIG. 1. Though FIG. 1 does not expressly show a virtual boundary associated with the hauling operation of the smart machine 200, the same or substantially the same operations as those discussed above for the loading operation can be performed for the hauling operation, and likewise for the dumping operation of the smart machine 200.

Dumb machines 250 may follow the smart machine 200 according to the same work cycle, with each dumb machine 250 moving, in succession, to the location 108 associated with the loading operation. When location information from each of the dumb machines 250 to the back office system 300 indicates that the dumb machine 250 has reached the virtual boundary 110, the back office system 300 can characterize the operation of the dumb machine 250 at the location 108 as corresponding to the loading operation. The same or similar operations can be performed for the hauling operation and the dumping operation of the dumb machines 250.

INDUSTRIAL APPLICABILITY

As noted above, the present disclosure relates to tracking activity of a plurality of machines, and more particularly to systems and method for tracking activity of at least one smart machine and/or at least one so-called non-smart or dumb machines.

Progress at a worksite can be tracked according to loads of material delivered. Management of loads delivered can involve identifying cycle time of each machine at a worksite, in an effort to make the work cycle as efficient as possible.

Tracking, according to embodiments of the disclosed subject matter, can generally involve implying information about the dumb machines from information from the smart machine (or machines). More specifically, tracking can involve automatically characterizing segments of a machine work cycle being performed by respective machines in a fleet (e.g., at a worksite) by collecting sensor data from a smart machine in the fleet, determining work cycle segments performed by the smart machine based on the sensor information from the smart machine, and associating the determined work cycle segments with tasks performed by the remaining dumb machines in the fleet using location information associated with the remaining dumb machines (e.g., only location information or only location and time information). Thus, it may not be necessary for a large number (e.g., all) machines at a worksite to have sensors to capture machine activity-related data pertaining to work segments and to transmit such machine activity-related data to a back office system in order to identify work segments of the machines.

Embodiments of the disclosed subject matter can dynamically utilize a data set of the smart machine (or machines), which is reporting exactly where it performed a work segment, to define one or more virtual boundaries (e.g., geofence) to associate corresponding work segments of the dumb machines (e.g., older machines which cannot identify and update the real time work cycle) using the location of the dumb machines. Each time the work segment location changes, the system can update the virtual boundary for the particular work cycle for the dumb machines. Use of a dynamic virtual boundary can reduce the size of the virtual boundary as compared to a situation where the virtual boundary is static. This can make placement of the virtual boundary more precise, which, in turn, can result in generation of more accurate work segment and work cycle (e.g., cycle time) information for the dumb machines.

Dynamic virtual boundary size setting can be based on fleet makeup of smart machine(s) and dumb machines, and optionally along with some knowledge of where each machine is supposed to be in the work cycle (e.g., where in the load, haul, dump route). Thus, the size of the virtual boundary can be adjusted based on how many smart machines are at the worksite or assigned to a particular zone. Generally, more smart machines can mean more data with respect to the dumb machines, so the virtual boundary (or boundaries) may be updated more frequently. As a more specific example, if the haul route is relatively long and there are not many machines, including only one smart machine, the virtual boundary may have to be relatively large in size. In a case where the virtual boundary is updated more frequently, for instance, due to a relatively small worksite and/or greater number of smart machines, the size of the virtual boundary may be able to be set relatively small in size.

Identifying work segments of the machines can be provided on a productivity tool, for instance, at the back office system 300 or a base system (not expressly shown). Information regarding the work cycle of the machines can be provided to show information pertaining to individual assets, groups of assets, worksites, dates, timing, etc. In this regard, in the case of dumb machines that may not be able to directly provide work cycle information for the productivity tool, as noted above, work cycle information about the dumb machines can be implied from work cycle information from the smart machine (or machines).

Figure 3:
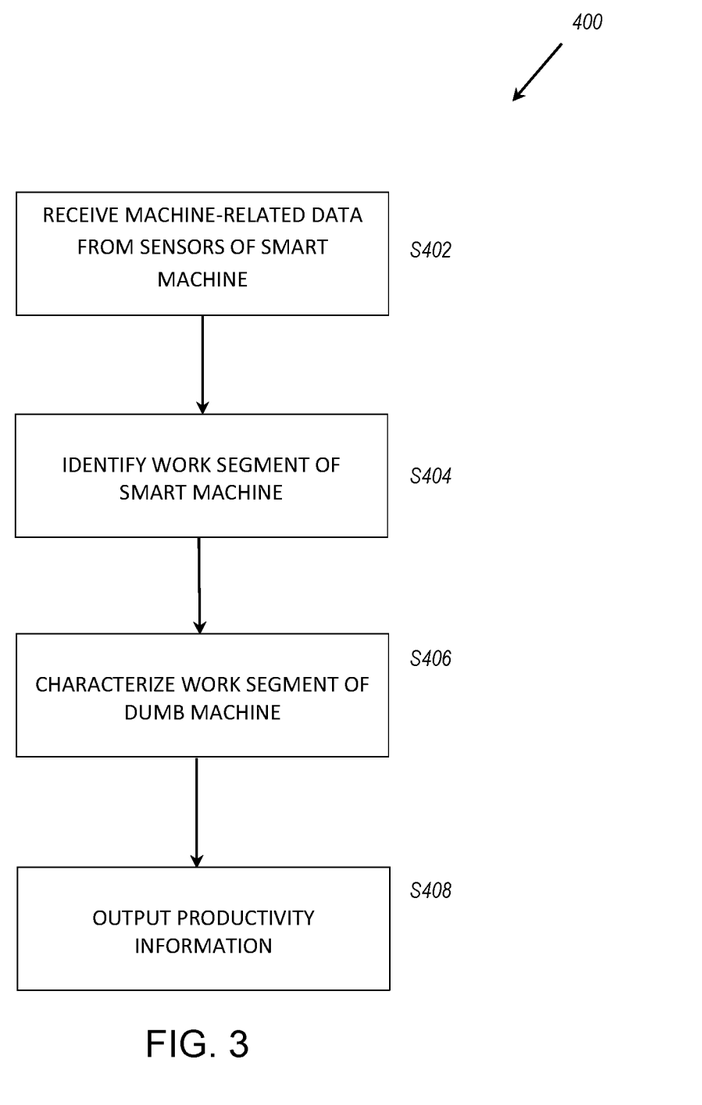
FIG. 3 is a flow chart of a method according to embodiments of the disclosed subject matter.

Turning to FIG. 3, FIG. 3 is a flow chart of a method 400 according to embodiments of the disclosed subject matter.

Generally, the method 400 can be characterized as a method for managing data from a worksite. More specifically, the method 400 may be characterized as a method of tracking activity of a plurality of machines of a fleet. The method 400 can be implemented by systems according to embodiments of the disclosed subject matter, such as system 100. Thus, the method 400, or portions thereof, can be implemented using a non-transitory computer-readable storage medium (or different media spread across the smart machine 200, the dumb machines 250, and the back office system 300) storing computer-readable instructions that, when executed by one or more computers (again, including of the smart machine 200, the dumb machines 250, and the back office system 300), cause the one or more computers to perform the method 400, or portions thereof as the case may be.

The method 400, at S402, can include receiving machine activity-related data at one or more smart machines 200. The data can be receive by respective sensors 20a, 20b, 20c, etc. of each smart machine 200. Such data can be indicative of the smart machine 200 performing a particular operation or work segment at the worksite 106, such as a loading operation, a hauling operation, or a dumping operation (when the smart machine 200 is a hauling truck). The machine activity-related data may be continuously or periodically collected by the sensors 20a, 20b, 20c, etc. and output to the onboard controller 20 of the smart machine 200.

At S404 the method 400 can include processing the machine activity-related data of the smart machine 200 to identify or characterize operations of the smart machine 200 as work segments. As noted above, work segments of the smart machine 200 in the form of a hauling truck may include, as examples, a loading operation as a work segment, a hauling operation as a work segment, and a dumping operation as a work segment.

Figure 4A:
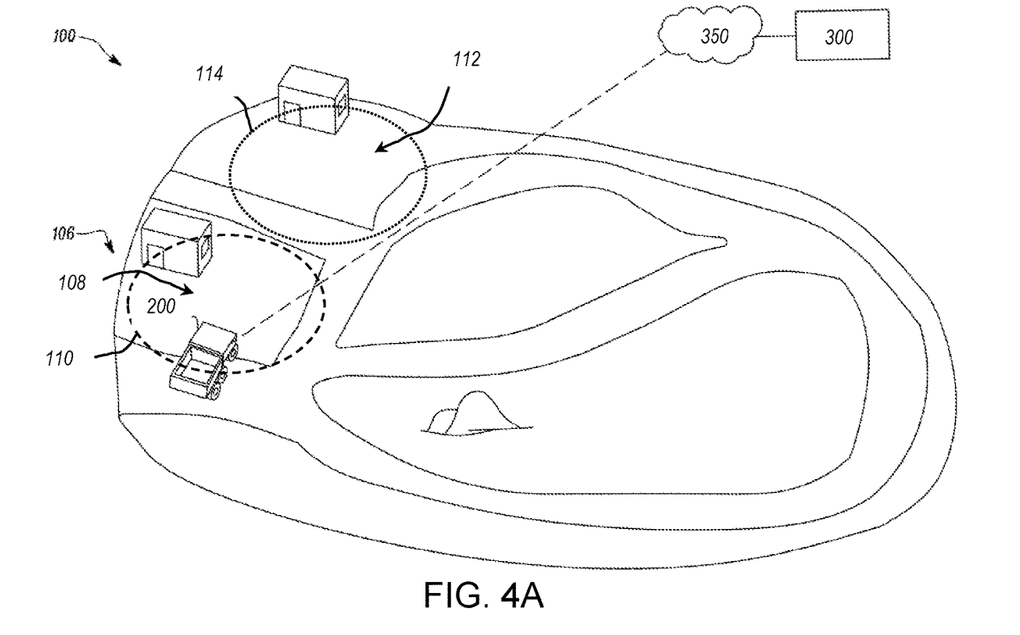
FIG. 4A and FIG. 4B show operational aspects of systems and methods according to embodiments of the disclosed subject matter.

The identification of each work segment of the smart machine 200 can be performed by the smart machine 200 and/or the back office system 300, and can be used to set a virtual boundary, such as virtual boundary 110, relative to the location 108 associated with the identified work segment. FIG. 4A shows a non-limiting example of creating virtual boundary 110 relative to position 108 associated with an identified loading operation of the smart machine 200. Such identification and generation of the virtual boundary 110 can be performed in real time. S404 can involve identifying multiple work segments of the smart machine 200 per work cycle (e.g., loading, hauling, and dumping) and/or multiple work segments of the smart machine 200 for different work cycles (e.g., a loading operation and a subsequent loading operation).

In some aspects, the setting of the virtual boundary 110 at S404 may be a repositioning of the virtual boundary 110 based on a newly identified work segment of the smart machine 200. For instance, the virtual boundary 110 may correspond to the smart machine 200 performing another loading operation at a location 108 different from a location 112 of a previous loading operation. As shown in FIG. 4A, a previous virtual boundary 114 may have been provided for the previous location 112. In this case, the virtual boundary 110 can be relocated from defining an area around the previous location 112 to defining an area around the new location 108 of the most recent or current loading operation of the smart machine 200. Upon creation of the virtual boundary 110, the virtual boundary 114 may be removed.

At S406 the method 400 can include identifying or characterizing work segments of the dumb machines 250. Such operation at S406 can be based on the previously identified work segments of the smart machine 200. Moreover, the identifying or characterizing of work segment of the dumb machines 250 can be based on location data of the dumb machines 250 received by the back office system 300. For instance, the back office system 300 may determine when the dumb machine 250 is within a predetermined distance from the location 108 of the work segment of the smart machine 200 based on the position information received from the dumb machine 250. S406 may involve identifying multiple work segments of the dumb machine 250 per work cycle (e.g., loading, hauling, and dumping) and/or multiple work segments of the dumb machine 250 for different work cycles (e.g., a loading operation and a subsequent loading operation).

As noted above, the predetermined distance may be defined by virtual boundary 110. In terms of data sent from the dumb machines 250, work segment characterization can be performed based on only location information from the dumb machines 250 (or only location and time information). Thus, when the dumb machine 250 is determined, based on its position information, to have reached the virtual boundary 110 that defines an already identified work segment (i.e., of the smart machine 200), operation of the dumb machine 250 within the virtual boundary 110, based on the location of the dumb machine, can be characterized as corresponding to the already identified work segment.

Figure 4B:
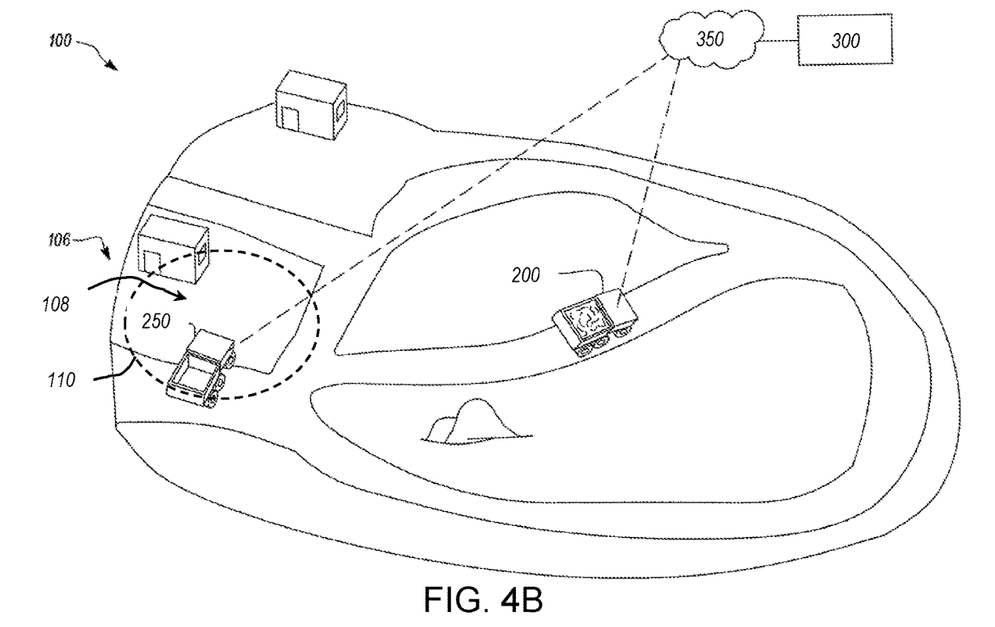

FIG. 4B shows an example where the dumb machine 250 enters the virtual boundary 110 previously set based on an identified work segment in the form of the loading operation for the smart machine 200. The presence of the dumb machine 250 in the virtual boundary 110 can result in characterization of operation of the dumb machine 250 at this location 108 corresponding to a loading operation of the dumb machine 250.

At S408 the method 400 can output productivity information for the smart machine 200 and the dumb machines 250. Such productivity information may be prepared using the back office system 300, and may furthermore be outputted at the back office system 300 for direct consumption at the back office system 300 or to another platform for consumption. Preparation of the productivity information may include determining work cycle time and/or number of loads for each smart machine 200 and/or each dumb machine 250.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

The invention claimed is:

1. A system for managing data from a worksite comprising:
    a back office telematics system, including processing circuitry, to automatically characterize work segments of work cycles at the worksite;
    a smart haul truck at the worksite to gather first operating data from a plurality of sensors of the smart haul truck and send, via first communication circuitry of the smart haul truck, the gathered first operating data to the back office telematics system via a wireless communication network; and
    a plurality of non-smart haul trucks at the worksite to send second operating data back to the back office telematics system,
    wherein the first operating data of the smart haul truck represents a work segment of a work cycle of the smart haul truck within the worksite,
    wherein the second operating data from the non-smart haul trucks includes only location information associated with the non-smart haul trucks within the worksite, and
    wherein the back office telematics system automatically characterizes work segments of each of the non-smart haul trucks by
    characterizing, using the first operating data, the work segment of the smart haul truck based on the first operating data, and
    associating the characterized work segment of the smart haul truck to a work segment of the non-smart haul truck based on the second operating data from the non-smart haul truck that includes only the location information associated with the non-smart haul truck.

2. The system for managing data from the worksite according to claim 1, wherein the back office telematics system associates the characterized work segment of the smart haul truck with the work segment of the non-smart haul truck when the non-smart haul truck is within a predetermined distance from a location associated with the characterized work segment of the smart haul truck.

3. The system for managing data from the worksite according to claim 1, wherein the characterizing the work segment of the smart haul truck based on the first operating data results in setting a geofence of a predetermined area around a location within the worksite associated with the characterized work segment of the smart haul truck.

4. The system for managing data from the worksite according to claim 1, wherein the characterizing the work segment of the smart haul truck based on the first operating data is performed multiple times for different work segments of the smart haul truck and, each time, results in setting a geofence around a different location within the worksite associated with the characterized different work segment of the smart haul truck.

5. The system for managing data from the worksite according to claim 1, wherein the location information includes a time corresponding to the location of each of the non-smart haul trucks.

6. The system for managing data from the worksite according to claim 1, wherein the back office telematics system automatically characterizes work segments for each of the non-smart haul trucks for a plurality of work cycles of each of the non-smart haul trucks.

7. The system for managing data from the worksite according to claim 1, wherein the back office telematics system automatically characterizes work segments for each of the non-smart haul trucks for a plurality of work segments per work cycle of each of the non-smart haul trucks.

8. The system for managing data from the worksite according to claim 1, wherein the back office telematics system provides work cycle productivity data for all of the non-smart haul trucks and the smart haul truck based on the associating the characterized work segment of the smart haul truck to the work segment of the non-smart haul truck.

9. The system for managing data from the worksite according to claim 1, wherein the back office telematics system automatically characterizes the work segments of each of the non-smart haul trucks by associating a characterized work segment of another smart haul truck to the work segment of the non-smart haul truck.

* * * * *